United States Patent [19]

VanAuken et al.

[11] 4,138,301
[45] Feb. 6, 1979

[54] FISHING ROD FERRULE

[75] Inventors: Richard VanAuken, Bridgewater; Albert T. Mills, Jr., Somerville, both of N.J.

[73] Assignee: Exxon Research & Engineering Co., Florham Park, N.J.

[21] Appl. No.: 787,050

[22] Filed: Apr. 13, 1977

Related U.S. Application Data

[62] Division of Ser. No. 604,178, Aug. 13, 1975, Pat. No. 4,083,140.

[51] Int. Cl.² .......................................... B65H 81/00
[52] U.S. Cl. ..................................... 156/189; 156/192
[58] Field of Search ....................... 156/189, 190–192; 428/902; 43/18 R, 18 GF

[56] References Cited

U.S. PATENT DOCUMENTS

| 4,043,074 | 8/1977 | Airhart | 43/18 GF |
| 4,070,127 | 1/1978 | Loomis et al. | 43/18 GF X |

FOREIGN PATENT DOCUMENTS

| 1349906 | 4/1974 | United Kingdom | 43/18 GF |
| 1351732 | 5/1974 | United Kingdom | 43/18 GF |

Primary Examiner—David A. Simmons
Attorney, Agent, or Firm—Joseph J. Dvorak

[57] ABSTRACT

A novel flexible ferrule is provided. The ferrule is a hollow tapered tube having walls formed from a plurality of layers of continuous graphite fiber-reinforced plastic sheet material in which the graphite fibers of one layer of sheet material are at an obtuse angle ranging from about 110° to about 140° relative to the fibers in the next superimposed graphite layer of sheet material. Interposed between and alternating with the graphite layers are layers of woven fiberglass material, the glass fibers of which are at right angles to each other.

5 Claims, 3 Drawing Figures

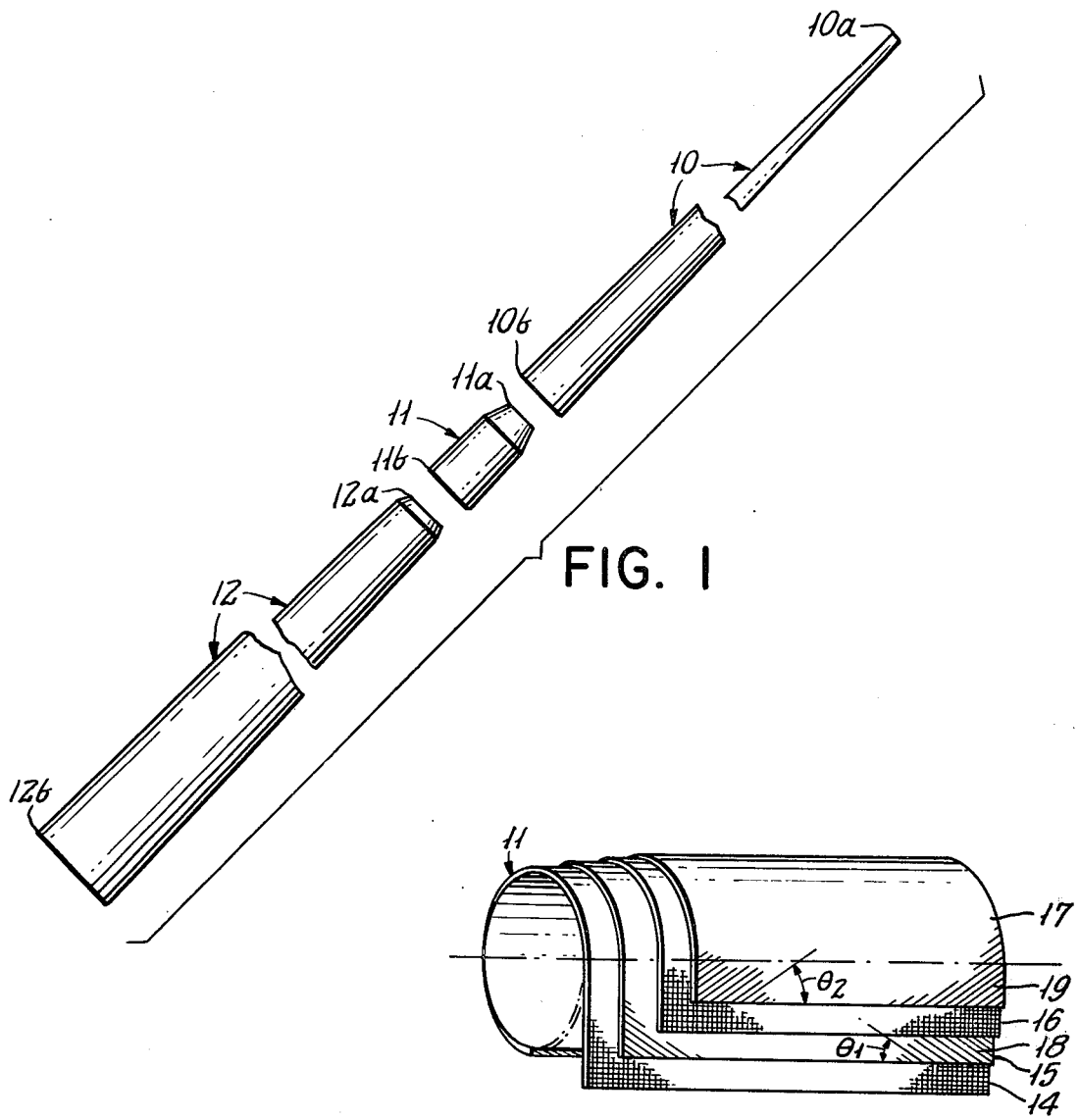
FIG. 1
FIG. 2
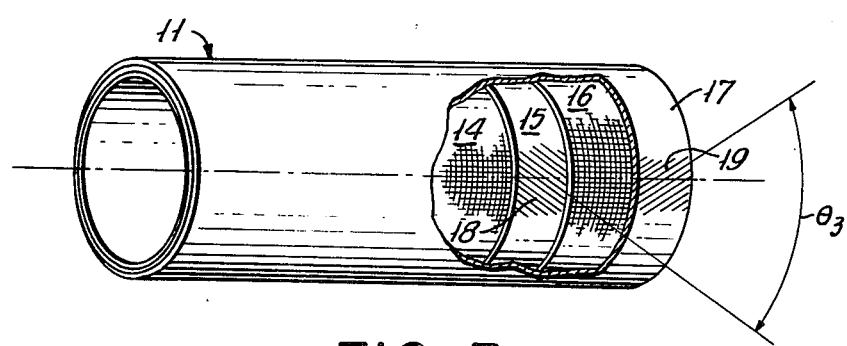
FIG. 3

FISHING ROD FERRULE

This is a division of application Ser. No. 604,178, filed Aug. 13, 1975, now U.S. Pat. No. 4,083,140.

BACKGROUND OF THE INVENTION

1. Field of the Invention

The present invention relates to fishing rods and is directed particularly to improvements in ferrules for fiber-reinforced plastic fishing rods.

2. Prior Art

It is a common practice to manufacture lengthy fishing rods such as fly casting type fishing rods, surf rods and the like, in multiple sections with various devices for detachably securing and coaxially aligning one section to the other thereby permitting the rods to be easily dismantled for transit and storage and the like and thereafter be reassembled for use. In the past, it had been the general practice with both bamboo and fiberglass fishing rods to provide some type of metallic ferrule or sleeve connector at certain longitudinal locations along the fishing rod to provide for detachably securing fishing rod sections one to the other. More recently, ferrules have been constructed of plastics and fiber-reinforced plastics for use particularly in conjunction with fiberglass fishing rods. Thus, in U.S. Pat. No. 3,152,820 there is described a thermo-plastic fishing rod ferrule that has a critical set of dimensions. As is known in the art, however, thermo-plastic resins such as the type described in the aforementioned patent are subject to creep and cold flow with the concomitant result that the flex or performance characteristics of the ferrule change considerably and indeed the ferrule is even subject to failure with time.

In U.S. Pat. No. 3,469,338 a fiberglass reinforced ferrule section is described in which woven glass fabric is employed in reinforcing the plastic ferrule. The fabric is so arranged that the glass fibers are at an angle of 90° with respect to each other. Indeed, some of the glass fibers extend longitudinally of the fishing rod and the remaining fibers extend at substantially right angles to the axis of the rod. The deficiency in this type of construction is that it tends to leave a flat spot in the rod when under load. Such construction suffers from the further disadvantage in that it does not permit uniform stress distribution which contributes to creep failure.

In graphite fiber-reinforced sectional fishing poles the disadvantages of the foregoing types of ferrules are greatly enhanced because of the strength characteristics of the graphite which transmit significant forces to the ferrule section when the fishing rod is under load resulting in failure of the ferrule and/or loss in the bending profile of the rod. A bending profile and sensitivity similar to a unitary or one-piece flexible rod is a commercially important criteria for multisectional fishing poles of all types.

SUMMARY OF THE INVENTION

In one aspect of the present invention, there is provided a novel flexible ferrule for a fiber-reinforced multisectional plastic fishing rod and particularly for a unidirectional graphite fiber-reinforced plastic fishing rod in which the ferrule is a hollow tapered tube having walls formed from a plurality of layers of continuous graphite fiber-reinforced plastic sheet material in which the graphite fibers of one layer of sheet material are at an obtuse angle ranging from about 110° to about 140°, preferably 116° to 128°, relative to the fibers in the next superimposed graphite layer of sheet material and in which there is interposed between the graphite layers a layer of woven fiberglass material, the glass fibers of which are at right angles to each other. The apex of the obtuse angle between the superimposed layers of graphite fibers is in substantial alignment with the longitudinal axis of the rod; and substantially half of the fibers in the woven glass cloth are in substantial alignment with the longitudinal axis of the rod and the remainder are at 90° with respect to the longitudinal axis of the rod.

This and other embodiments of the present invention will become evident from the following detailed description in conjunction with the accompanying drawings.

BRIEF DESCRIPTION OF THE DRAWINGS

FIG. 1 shows three pieces of a fishing rod blank prior to assembly.

FIG. 2 is an isometric drawing, partly in perspective and partly cut away, showing the preferred number of layers of material used in forming the ferrule of the present invention.

FIG. 3 is a view, partly cut away and partly in perspective, showing the relationship of the various fibers to one another in the fishing ferrule.

DETAILED DESCRIPTION OF THE INVENTION

In referring now to the drawings, it should be noted that like reference characters designate corresponding parts throughout the several drawings and views.

The three components of FIG. 1 constitute the major components of a two piece fishing rod blank prior to assembly. Basically, these three rod blank components consist of a tip section designated as 10, a ferrule section designated generally as 11 and a butt section designated generally as 12. Tip section 10 and butt section 12 of the fishing rod blank are tapered tubes of fiber-reinforced plastic resin such as glass and graphite fiber-reinforced plastic resin. These sections are fabricated by techniques and from materials well known in the art. Preferably the tip section 10 and the butt section 12 are fabricated from graphite-reinforced resin, such as epoxy, polyesters and phenolic resins. The fibers in the tip section 10 and butt section 12 are substantially parallel to the longitudinal axis of these tubular sections.

As can be seen in FIG. 1, tip section 10 is tapered with a more narrow portion 10a and a wider section 10b. Similarly tapered butt section 12 has a more narrow end 12a and a wider section 12b. Tapered ferrule section 11 also has a more narrow portion 11a and a wider section 11b.

In the practice of the present invention, the tip section 10 and the butt section 12 of the rod blank are fabricated so as to have a length which is longer than the desired length of the finished fishing pole. Preferably the tip section 10 and the butt section 12 are manufactured so that they are at least 12 inches longer than the desired length of the pole. It is most important, moreover, that the more narrow end region 12a of the butt section 12 and the wider region 10b of tip section 10 be of substantially identical dimensions over a reasonable length, generally of up to about 12 inches. The ferrule section 11 of rod blank also has a precision taper which is substantially identical to the taper of the matching dimensions of the tip and butt section.

As indicated, ferrule section 11 of the rod blank is tubular; however, it is made from a plurality of layers of sheet material as explained more fully hereinafter in conjunction with FIG. 2. At least 4 layers of sheet material are used in forming the ferrule section 11. Thus, there is provided a first layer 12, a second layer 15, a third layer 16 and a fourth layer 17. Both second layer 15 and fourth layer 17 are sheets of unidirectional graphite fibers impregnated with a thermosetting resin in the shape of a predetermined pattern. Both second layer 15 and fourth layer 17 each have a thickness of about 0.004 to 0.020 inches and contain from about 35 to 70 volume % of continuous unidirectional graphite fibers in the resin matrix. Among the preferred thermoset resin materials useful in forming the ferrule of the present invention are epoxy and polyester resins. Preferably, however, second layer 15 and fourth layer 17 have from 55 to 60 volume % graphite fibers in an epoxy resin matrix.

The epoxy resins or polyepoxides useful in the practice of the present invention are well known condensation products of compounds containing oxirane rings with compounds containing hydroxyl groups or active hydrogen atoms such as amines, acids or acid aldehydes. The most common epoxy resin compounds are those of epichlorohydrin and Bis-phenol A and its homologs.

The polyester resins are poly condensation products of polybasic acids with polyhydric alcohols. Typical polyesters include polyterephthalates such as poly(ethylene terephthalate).

As is known in the art, these thermoset resins also include modifying agents such as hardeners and the like. Forming such compositions is no part of the present invention. Indeed, the preferred modified epoxy resin and impregnated graphite fibers are commercially available materials. For example, modified epoxy pre-impregnated graphite fibers are sold under the tradename Narmco 5209 and Narmco 5213 by Whitaker Corporation of California. Other commercial sources of resin pre-impregnated graphite fibers are known in the industry.

Returning to the drawings, as can be seen in the cut out of FIG. 2, the unidirectional graphite fibers 18 of second layer 15 are oriented at a specific predetermined angle, $\theta_1$, with respect to the major axis of second layer 15. Fourth layer 17 is identical in size and pattern to second layer 15; however, the unidirectional graphite fibers 19 of fourth layer 17 are oriented at a specific predetermined angle, $\theta_2$, with respect to the major axis of fourth layer 17, which angle preferably is of the same dimension but of opposite sign of the angle of orientation of the fibers in second layer 15.

As is shown in FIG. 2, a first layer 14 of sheet material is placed adjacent to (i.e. below) layer 15. A fourth layer 16, as shown in FIG. 2, is interposed between second layer 15 and fourth layer 17. Layers 14 and 16 each consist of a thin sheet of woven glass fabric having a thickness of about 0.001 to about 0.002 inches. Preferably a fiberglass fabric known in the trade as fiberglass scrim is used. An especially useful fiberglass scrim is style 107 sold by Burlington Glass Fabrics Company, New York.

In fabricating the ferrule 11, layers 14 and 15, 16 and 17 are cut from stock material to the desired flat pattern. Each layer is cut to have the same size and shape. The marginal edges along the minor axis of the oblong shaped material should be sufficiently wide to accommodate at least one complete turn about a tapered mandrel. The taper of the mandrel, of course, is designed to be precisely identical to the desired taper of the ultimate tubular ferrule. In any event, the precise dimensions of the end marginal edges of the oblong shaped sheet material will be determined by the number of convolutions of the material that is to be wound around the mandrel. The number of complete convolutions generally will range from about 2 to about 6.

The major axis of the flat pattern will be determined by the desired length of the ferrule. In other words, the major axis, preferably is equal in length to the length of the ultimate ferrule.

In any event, a second layer 15 of thermoset resin impregnated unidirectional graphite fibers is provided in which the unidirectional graphite fibers are oriented at a specific predetermined angle, $\theta_1$, with respect to the major axis of said layer; and, a fourth layer 17 of thermoset resin impregnated unidirectional graphite fibers also is provided. The unidirectional graphite fibers in fourth layer 17, however, are oriented at a negative specific predetermined angle, $\theta_2$, with respect to the major axis of said pattern. The angle of orientation of the fibers in layer 17 range generally between about 55° to about 70° (preferably between 58° and 64°) and the angle of orientation of the fibers to layer 15 will range between about $-55°$ to about $-70°$ (preferably between $-58°$ and $-64°$). Preferably the angle of orientation of fibers in second layer 15 and fourth layer 17 is of the same dimension but of opposite sign. Thus, the graphite fibers in the resin layers are preferably arranged at an angle of from about $\pm 55°$ to about $\pm 70°$ (preferably $\pm 58°$ to $\pm 64°$) with respect to the major axis of the pattern and hence the longitudinal axis of the ferrule. It is particularly preferred, however, that the graphite fibers be oriented at $\pm 60°$ with respect to the major axis of the pattern.

Viewing the graphite fiber orientation from the perspective shown in FIG. 3, it can be seen that the graphite fibers of one layer of sheet material in the ferrule member 11 are at an obtuse angle, $\theta_3$, relative to the fibers in the next superimposed graphite fiber-reinforced layer of sheet material. This obtuse angle will range generally between 110° to about 140° and preferably between 116° to 128°. It is particularly preferred, however, that $\theta_3$ be about 120°. Also, as can be seen in FIG. 3, the apex of the angle between the superimposed layers of graphite fibers is in substantial alignment with the longitudinal axis of the ferrule.

Returning to FIG. 2, it can be seen that layers 14 and 16 cut are cut from woven fiberglass fabric in such a manner that the fibers of such layers are at an angle of 0° and 90° with respect to the major axis of the oblong shaped sheet and hence the longitudinal axis of the ferrule. In other words, substantially half the glass fibers are in substantial alignment with the longitudinal or major axis of the pattern and the balance are at 90° with respect to the longitudinal axis. While some variation in the orientation of the glass fibers is permissable, this variation should not be more than $\pm 10°$ from the most preferred orientation of 0° and 90°.

As can be seen in FIG. 2, layer 14 is placed so as to be in initial contact with a mandrel when the oblong blank of material is wound around a mandrel.

To form the tubular ferrule, the layers 14, 15, 16 and 17 are arranged in the alternating fashion hereinbefore described and are wrapped around a mandrel (not shown). The mandrel, of course, is selected to provide a predetermined desired taper in the ferrule. Additionally, the mandrel can be cleaned and pretreated with a suitable material such as a commercially available silicon parting or release agent.

The oblong blank laminated material can be wrapped around the mandrel by any suitable means known in the art. For example, cellophane tape can be used to hold the blank laminated material around the mandrel. Preferably the oblong blank laminated material is held in place around a mandrel by a wrapping of cellulose acetate tape or sheet material (not shown) which serves in effect as a mold and which is subsequently removed as hereinafter described.

After wrapping the oblong blank laminated material around the mandrel, the assembly is placed in an oven and heated to a temperature sufficient to cause bonding of the separate layers and various convolutions to each other. The temperature at which the assembly is heated depends on a number of factors including the resin which is used to impregnate the graphite fibers. These temperatures are also well known; typically from modified epoxy resin impregnated graphite fiber, the temperature will be in the range of about 100° C. to about 180° C., and preferably at about 140° C.

After heating the assembly to produce the necessary bonding of the individual layers 14, 15, 16 and 17 in the various convolutions of laminated material in the desired tubular shape, the mandrel is removed.

If an external cellulose acetate wrapping film was used to hold the laminate around the mandrel, this too is removed by suitable means such as sanding the surface of the tube or dissolving the celluose acetate in a suitable solvent. Also, the cellulose acetate surface film can be removed by slitting the film and blasting with high pressure water.

Surface imperfections, if there are any, on the finished tube can be removed by sanding, grinding and the like. For example, subjecting the tube to a centerless grinding step after solvent removal of the cellulose acetate provides a completely uniform appearing exterior surface.

In assemblying the rod blank, the narrow end 10a of the tip is inserted in the wider end 11b of ferrule 11. Ferrule 11 is then dropped down the length of the tip section to the wider portion of the tip section 10b so that approximately 1½ inches of ferrule 11 overlap tip section 10 in the region 10b. The ferrule is bonded to the tip section 10 in the region 10a by well known bonding agents such as epoxy and cyanoethylacrylate adhesives. Thereafter, the butt section 12 of the rod blank is cut back from the more narrow end 12a until it fits snugly, for a distance of about 1¼ inches, within the ferrule. In this manner the precision taper of the ferrule is matched to the precision taper of the tip section of the rod and bonded thereto. Then the fishing rod blank is assembled and the tip section with the bonded ferrule is detachably mounted in coaxial alignment with the butt section. Thus, the precision taper of the narrower region 12a of the butt section 12 is fitted within the precision taper of the wider section of the ferrule 11. Finally, the butt section of the rod is cut off at the wider end 12b so that the ferrule will be in the center of the rod blank.

Needless to say, the rod blank is ultimately fitted with line guides, handles, etc. by well known techniques.

While the subject invention was described in detail with reference to a two piece fishing rod, fishing rods having more than two pieces can be prepared in accordance with the foregoing techniques and are contemplated by the present invention.

What is claimed is:
1. The method of forming a fiber-reinforced plastic ferrule for a multisectional fishing rod comprising the steps of:
   cutting a sheet of glass cloth to a predetermined flat pattern to provide a first layer having the fibers oriented therein at angles of 0° and 90° with respect to the major axis of said flat pattern;
   cutting a sheet of resin impregnated unidirectional graphite fibers to the same predetermined flat pattern to provide a second layer having fibers oriented at an angle ranging from about 55° to about 70° with respect to the major axis of the predetermined flat pattern;
   cutting a sheet of glass cloth to the same predetermined pattern to provide a third layer having the same fiber orientation as the first layer;
   cutting a resin impregnated unidirectional sheet material to the same predetermined flat pattern to provide a fourth layer having the fibers oriented at an angle ranging from about −55° to about −70° with respect to the major axis of the predetermined flat pattern;
   arranging said glass cloth and graphite fiber layers in alternating fashion thereby forming a laminated material;
   wrapping said laminated material around a tapered mandrel;
   heating said assembly of wrapped laminated material and mandrel to a temperature sufficient to cause the resin of the layers to fuse; and
   thereafter allowing the fused material to cool and removing the mandrel.

2. The method of claim 1 wherein the assembly is heated at temperatures in the range of 100° C. to about 180° C.

3. The method of claim 1 wherein the predetermined flat pattern is sized sufficient to form a number of convolutions when wrapped around the mandrel and wherein at least one of the glass layers is used adjacent the mandrel prior to wrapping.

4. The method of claim 3 wherein the number of convolutions is between 2 to 6.

5. The method of forming a fiber-reinforced plastic ferrule for a multisectional fishing rod comprising:
   forming a laminate of sheet material in a predetermined flat pattern, said laminate having at least two layers of woven glass fabric and at least two layers of resin impregnated unidirectional graphite fiber layers, the graphite fibers and glass layers being alternated in said laminate, the glass fibers in said glass layers being oriented substantially at an angle of 0° and 90° with respect to the major axis of the flat pattern, substantially half the graphite fibers being oriented at an angle ranging from about 55° to about 70° with respect to the major axis of the flat pattern and the balance of the graphite fibers being oriented at an angle ranging from about −55° to about −70° with respect to the major axis of the flat pattern;
   forming said laminate of sheet material into a tubular shape;
   heating the tubular shape to a temperature sufficient to cause the resin impregnating the graphite fibers to fuse; and, thereafter allowing the fused material to cool.

* * * * *